United States Patent
Gath et al.

(10) Patent No.: US 10,442,392 B2
(45) Date of Patent: Oct. 15, 2019

(54) VEHICLE SEAT BELT SYSTEM HAVING AIR DISTRIBUTION MANIFOLD

(71) Applicant: Ford Global Technologies, LLC, Dearborn, MI (US)

(72) Inventors: Kerrie Gath, Pittsfield, MI (US); John Craig Elson, Bloomfield Township, MI (US); Victoria Schein, Dearborn, MI (US); Clay Wesley Maranville, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 15/834,247

(22) Filed: Dec. 7, 2017

(65) Prior Publication Data

US 2019/0176748 A1    Jun. 13, 2019

(51) Int. Cl.
*B60R 22/12* (2006.01)
*B60H 1/00* (2006.01)
*B60R 21/18* (2006.01)
*B60R 21/239* (2006.01)
*B60R 21/235* (2006.01)
*B60R 22/18* (2006.01)

(52) U.S. Cl.
CPC .......... *B60R 22/12* (2013.01); *B60H 1/00271* (2013.01); *B60R 21/18* (2013.01); *B60R 21/239* (2013.01); *B60R 2021/23519* (2013.01); *B60R 2022/1806* (2013.01)

(58) Field of Classification Search
CPC ................ B60R 21/18; B60R 22/12
See application file for complete search history.

(56) References Cited

U.S. PATENT DOCUMENTS

| 3,306,662 | A | * | 2/1967 | Finnigan | B60R 22/00 297/482 |
| 3,682,498 | A | | 8/1972 | Rutzki | |
| 3,801,156 | A | * | 4/1974 | Granig | B60R 21/18 280/733 |
| 3,820,814 | A | | 6/1974 | Allgaier et al. | |
| 3,865,398 | A | | 2/1975 | Woll | |

(Continued)

FOREIGN PATENT DOCUMENTS

AT            300591       7/1972
DE      102008034633 A1   1/2010
(Continued)

OTHER PUBLICATIONS

U.S. Statutory Invention Registration No. H902, published Apr. 2, 1991, to Rousseau.

(Continued)

*Primary Examiner* — Nicole T Verley
(74) *Attorney, Agent, or Firm* — Vichit Chea; Price Heneveld LLP

(57) ABSTRACT

A vehicle seat belt system is provided. The vehicle seat belt system includes a seat belt comprising a tubular seat belt webbing defining a passageway and a plurality of exhaust openings. The seat belt system also has an air porous compressible material disposed within the passageway. The seat belt buckle has an air delivery device that supplies air to the seat belt, wherein the air porous compressible material allows air to flow through the passageway when compressed.

14 Claims, 5 Drawing Sheets

(56) References Cited

U.S. PATENT DOCUMENTS

| | | | |
|---|---|---|---|
| 3,866,940 A | 2/1975 | Lewis | |
| 3,874,694 A | 4/1975 | Stephenson | |
| 3,887,213 A | 6/1975 | Goetz | |
| 3,905,615 A * | 9/1975 | Schulman | B60R 21/18 244/122 B |
| 3,970,329 A | 7/1976 | Lewis | |
| 3,975,258 A * | 8/1976 | Fox | B60R 21/18 280/733 |
| 4,370,784 A * | 2/1983 | Turnbull | B60R 22/12 28/166 |
| 4,565,991 A | 1/1986 | Lupoli et al. | |
| 5,016,913 A | 5/1991 | Nakajima et al. | |
| 5,346,250 A | 9/1994 | Kamiyama | |
| 5,385,367 A | 1/1995 | Tanaka et al. | |
| 5,445,411 A | 8/1995 | Kamiyama et al. | |
| 5,466,003 A | 11/1995 | Tanaka et al. | |
| 5,474,326 A | 12/1995 | Cho | |
| 5,492,363 A | 2/1996 | Hartmeyer et al. | |
| 5,494,314 A | 2/1996 | Kriska et al. | |
| 5,653,741 A | 8/1997 | Grant | |
| 5,727,814 A | 3/1998 | White | |
| 5,730,121 A | 3/1998 | Hawkins, Jr. et al. | |
| 5,765,869 A | 6/1998 | Huber | |
| 6,019,388 A | 2/2000 | Okazaki et al. | |
| 6,039,347 A | 3/2000 | Maynard | |
| 6,062,597 A | 5/2000 | Suyama | |
| 6,082,763 A | 7/2000 | Kokeguchi | |
| 6,220,626 B1 * | 4/2001 | Utsumi | B60R 21/18 280/733 |
| 6,443,487 B1 * | 9/2002 | Suyama | B60R 21/18 280/733 |
| 6,471,243 B1 * | 10/2002 | Brown | B60R 21/18 280/733 |
| 6,540,040 B1 | 4/2003 | Patel | |
| 6,630,414 B1 | 10/2003 | Matsumoto | |
| 6,737,610 B1 | 5/2004 | Horn et al. | |
| 6,993,930 B2 * | 2/2006 | Blackstone | A41D 13/0025 601/15 |
| 7,201,024 B2 * | 4/2007 | Hirayama | D04B 21/12 66/192 |
| 7,434,833 B2 * | 10/2008 | Kore | B60R 21/18 280/733 |
| 7,543,849 B2 | 6/2009 | Bradburn | |
| 7,770,921 B2 | 8/2010 | Mueller et al. | |
| 7,788,952 B2 | 9/2010 | Morrison | |
| 7,977,608 B2 | 7/2011 | Diemer et al. | |
| 8,269,512 B2 | 9/2012 | Ootaka | |
| 8,876,580 B2 | 11/2014 | Castro | |
| 9,027,961 B2 * | 5/2015 | Yamataki | B60R 21/18 280/728.1 |
| 9,204,493 B2 | 12/2015 | Yoshimoto et al. | |
| 9,346,430 B2 * | 5/2016 | Wang | B60R 21/18 |
| 9,539,983 B2 | 1/2017 | Demeritte | |
| 9,744,933 B1 | 8/2017 | Rao et al. | |
| 9,902,358 B2 | 2/2018 | Okubo et al. | |
| 9,981,623 B2 * | 5/2018 | Kobata | B60R 21/18 |
| 10,143,043 B1 | 11/2018 | Elson et al. | |
| 2002/0101066 A1 | 8/2002 | Tanase et al. | |
| 2002/0125701 A1 | 9/2002 | Devonport | |
| 2002/0125702 A1 | 9/2002 | Ohhashi | |
| 2003/0038463 A1 | 2/2003 | Stonich et al. | |
| 2003/0206834 A1 | 11/2003 | Chiao et al. | |
| 2003/0222446 A1 | 12/2003 | Soderquist et al. | |
| 2004/0140660 A1 | 7/2004 | Xu | |
| 2004/0262294 A1 | 12/2004 | Horey et al. | |
| 2005/0189752 A1 | 9/2005 | Itoga et al. | |
| 2006/0208471 A1 | 9/2006 | Sundararajan et al. | |
| 2007/0170710 A1 | 7/2007 | Bouquier | |
| 2008/0252052 A1 | 10/2008 | Schneider et al. | |
| 2009/0301339 A1 | 12/2009 | Ito et al. | |
| 2011/0068565 A1 | 3/2011 | Arnold et al. | |
| 2011/0282637 A1 * | 11/2011 | Yeh | G06F 17/5018 703/2 |
| 2012/0055914 A1 | 3/2012 | Goto et al. | |
| 2012/0242115 A1 | 9/2012 | Schreiber | |
| 2013/0026744 A1 | 1/2013 | Fischer et al. | |
| 2013/0106083 A1 | 5/2013 | Burczyk et al. | |
| 2014/0062071 A1 | 3/2014 | Ishiguro et al. | |
| 2014/0080373 A1 * | 3/2014 | Keitch | D04B 21/16 442/1 |
| 2014/0225354 A1 | 8/2014 | Williams et al. | |
| 2014/0246415 A1 | 9/2014 | Wittkowski | |
| 2015/0054268 A1 | 2/2015 | Raines et al. | |
| 2015/0084323 A1 | 3/2015 | Han et al. | |
| 2015/0239422 A1 | 8/2015 | Ishiguro et al. | |
| 2016/0059818 A1 | 3/2016 | Witt et al. | |
| 2016/0059819 A1 | 3/2016 | Witt et al. | |
| 2016/0236641 A1 | 8/2016 | Okubo et al. | |
| 2016/0250987 A1 | 9/2016 | Okubo et al. | |
| 2016/0303943 A1 * | 10/2016 | Arens | B60R 22/12 |
| 2017/0190310 A1 | 7/2017 | Okubo et al. | |
| 2017/0196516 A1 | 7/2017 | Matsumoto | |
| 2017/0341621 A1 * | 11/2017 | Helvoort | B60R 22/14 |
| 2018/0281726 A1 | 10/2018 | Murakami et al. | |
| 2019/0023212 A1 * | 1/2019 | Spahn | B60R 21/18 |

FOREIGN PATENT DOCUMENTS

| | | | |
|---|---|---|---|
| FR | 2765834 A1 | | 1/1999 |
| JP | 4331853 B2 | * | 9/2009 |
| JP | 2013226882 A | | 11/2013 |
| JP | 2015039901 A | | 3/2015 |
| JP | 2016144980 A | * | 8/2016 |
| WO | 2015061494 A1 | | 4/2015 |

OTHER PUBLICATIONS

U.S. Appl. No. 15/834,170, filed Dec. 7, 2017, entitled "Vehicle Seat Belt System Having Electrical Connector," (21 pages of specification and 22 pages of drawings) and filing receipt.

U.S. Appl. No. 15/834,191, filed Dec. 7, 2017, entitled "Heated Seat Belt," (21 pages of specification and 22 pages of drawings) and filing receipt.

U.S. Appl. No. 15/834,217, filed Dec. 7, 2017, entitled "Vehicle Seat Belt System Having Uniform Air Delivery," (14 pages of specification and 8 pages of drawings) and filing receipt.

U.S. Appl. No. 15/834,266, filed Dec. 7, 2017, entitled "Vehicle Seat Belt Having Tubes for Air Delivery," (14 pages of specification and 6 pages of drawings) and filing receipt.

U.S. Appl. No. 15/653,602, filed Jul. 19, 2017, entitled "Tubular Seat Belt System Having Air Delivery," (13 pages of specification and 7 pages of drawings) and filing receipt.

* cited by examiner

VEHICLE SEAT BELT SYSTEM HAVING AIR DISTRIBUTION MANIFOLD

FIELD OF THE INVENTION

The present invention generally relates to vehicle seat belts, and more particularly relates to the delivery of air through the seat belt for enhanced air distribution.

BACKGROUND OF THE INVENTION

Automotive vehicles are typically equipped with seat belts for restraining passengers seated in vehicle seats. Conventional seat belts typically include a lap belt and a shoulder belt connected to a buckle which, in turn, connects to the vehicle structure, such as a seat or floor. The seat belt is typically made of a seat belt webbing that contacts the body of the seated passenger. The webbing can contribute to a buildup of thermal energy and cause discomfort for some passengers. It is desirable to provide for a seat belt system that provides enhanced air flow for the seated passenger.

SUMMARY OF THE INVENTION

According to one aspect of the present invention, a vehicle seat belt system is provided. The vehicle seat belt system includes a seat belt comprising a tubular seat belt webbing defining a passageway and a plurality of exhaust openings and an air porous compressible material disposed within the passageway. The vehicle seat belt system further includes an air delivery device supplying air to the seat belt. The air porous compressible material allows air to flow through the passageway when compressed.

Embodiments of the first aspect of the invention can include any one or a combination of the following features:
  the air porous compressible material comprises openings having a size in the range of 100 square microns to 10 square centimeters;
  the air porous compressible material comprises a lattice structure;
  the air porous compressible material compresses a rubber foam material;
  the seat belt comprises a shoulder belt, wherein the passageway, the plurality of exhaust openings and the air porous compressible material are formed in the shoulder belt;
  the seat belt system further includes a buckle for connecting with the seat belt webbing, wherein air from the air delivery device enters the webbing through the buckle; and
  the air porous compressible material comprises at least one of polyurethane, polycarbonate, polycarbonate alloys, ethyl vinyl acetate, polypropylene, polyethylene, polyvinylidene fluoride, polytetrafluoroethylene (PTFE), nylon webbing, polymer fibers (PE/PET), highly compressed polymer fibers, origami folded smart polymers, nanocapsules, aerogel, and naturally porous fibers.

According to another aspect of the present invention, a vehicle seat belt system is provided. The vehicle seat belt system includes a seat belt comprising a tubular seat belt webbing defining a passageway and a plurality of exhaust openings and an air porous compressible material disposed within the passageway. The vehicle seat belt system further includes an air delivery device supplying air to the seat belt. The air porous compressible material maintains an opening the passageway to allow air to flow through the passageway when compressed.

Embodiments of the second aspect of the invention can include any one or a combination of the following features:
  the air porous compressible material comprises openings having a size in the range of 100 square microns to 10 square centimeters;
  the air porous compressible material comprises a lattice structure;
  the air porous compressible material compresses a rubber foam material;
  the seat belt comprises a shoulder belt, wherein the passageway, the exhaust openings and the air porous compressible material are formed in the shoulder belt;
  the seat belt system further includes a buckle for connecting with the seat belt webbing, wherein air from the air delivery device enters the webbing through the buckle; and
  the air porous compressible material comprises at least one of polyurethane, polycarbonate, polycarbonate alloys, ethyl vinyl acetate, polypropylene, polyethylene, polyvinylidene fluoride, polytetrafluoroethylene (PTFE), nylon webbing, polymer fibers (PE/PET), highly compressed polymer fibers, origami folded smart polymers, nanocapsules, aerogel, and naturally porous fibers.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
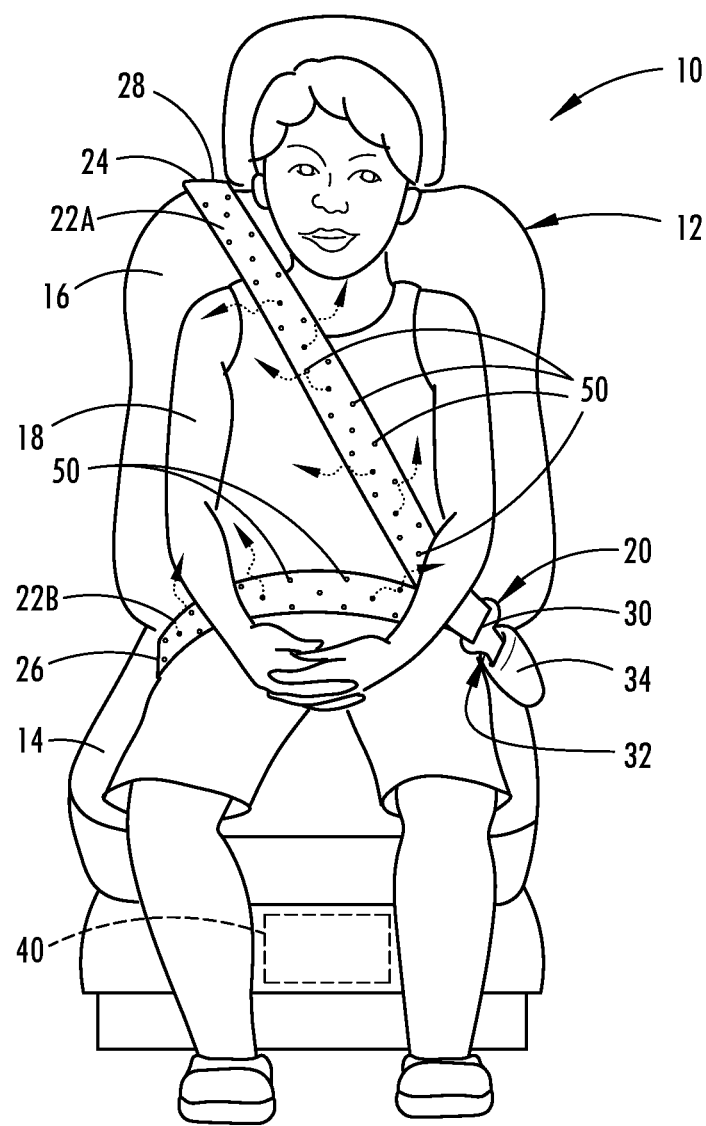
FIG. 1 is a perspective view of the passenger cabin of an automotive vehicle having a seat belt system restraining a person seated on a seat assembly and configured with air delivery, according to one embodiment.

Referring now to FIG. 1, a portion of the passenger cabin or compartment of a vehicle 10 is generally illustrated having a seat belt system 20 assembled onto a seat assembly 12 and including an air delivery arrangement for delivering forced air to a passageway in the seat belt webbing, according to one embodiment. The vehicle 10 may include a wheeled motor vehicle, such as a car, truck, van or any other type of vehicle that includes a seat belt system. The seat assembly 12 is generally illustrated including a lower seat 14 pivotally connected to an upper seat back 16 and configured to receive and retain a seated passenger 18. It should be appreciated that the vehicle 10 may include a plurality of seat assemblies 12 each including a seat belt system 20 as shown and described herein.

The seat belt system 20 is shown as a three-point seat belt configuration having a tubular seat belt webbing 24 connected at a first connection point 28 generally near the top of the seat back 16 or another supporting portion within the vehicle such as the B-pillar, a second connection point 26 connected to the floor or the seat 14 of the vehicle generally in the region of the lap of the passenger seated on the seat 14, and a third connection point 30 shown connected to a connector tongue 32 which releasably connects or fastens to a seat belt buckle 34. The connector tongue 32 is matingly and releasably coupled to the seat belt buckle 34 for fastening the tongue 32 onto the buckle 34. The seat belt system 20 includes the seat belt comprising the tubular seat belt webbing 24 defining an interior passageway and a plurality of air exhaust openings 50 formed therein for delivering air. In the embodiment shown, the seat belt webbing 24 includes a shoulder belt 22A that is generally positioned to extend from the lap over the shoulder and chest of a passenger and a lap belt 22B which is positioned to extend over the lap of the passenger when seated in the seat assembly 12. The lap belt 22B and shoulder belt 22A may be connected to one another or may be separate belts. It should be appreciated that the shoulder belt 22A or the lap belt 22B or both the shoulder belt 22A and lap belt 22B may include the tubular passageway operatively coupled to an air delivery device and air exhaust openings 50, according to various embodiments.

The vehicle seat belt system 20 also includes an air delivery device 40 for supplying forced air into a passageway in the seat belt webbing 24. The air delivery device 40 may be located within or below the vehicle seat assembly 12, as shown in FIG. 1, according to one embodiment. It should be appreciated that the air delivery device 40 may be a shared or dedicated air delivery system and may be located elsewhere on the vehicle. The air delivery device 40 may include a heating, ventilation and air conditioning (HVAC) system for delivering heated or cooled air through air ducts. In addition, the air delivery device 40 may deliver air in the form of oxygen, humidified air, or olfactory scented air, which may be delivered into the passageway within the seat belt webbing 24 and output through the exhaust openings 50. The air delivery device 40 delivers the air into the passageway in the seat belt buckle 34 and the air passes through the connector tongue 32 into the seat belt passageway in the seat belt webbing 24, according to one embodiment.

Figure 2:
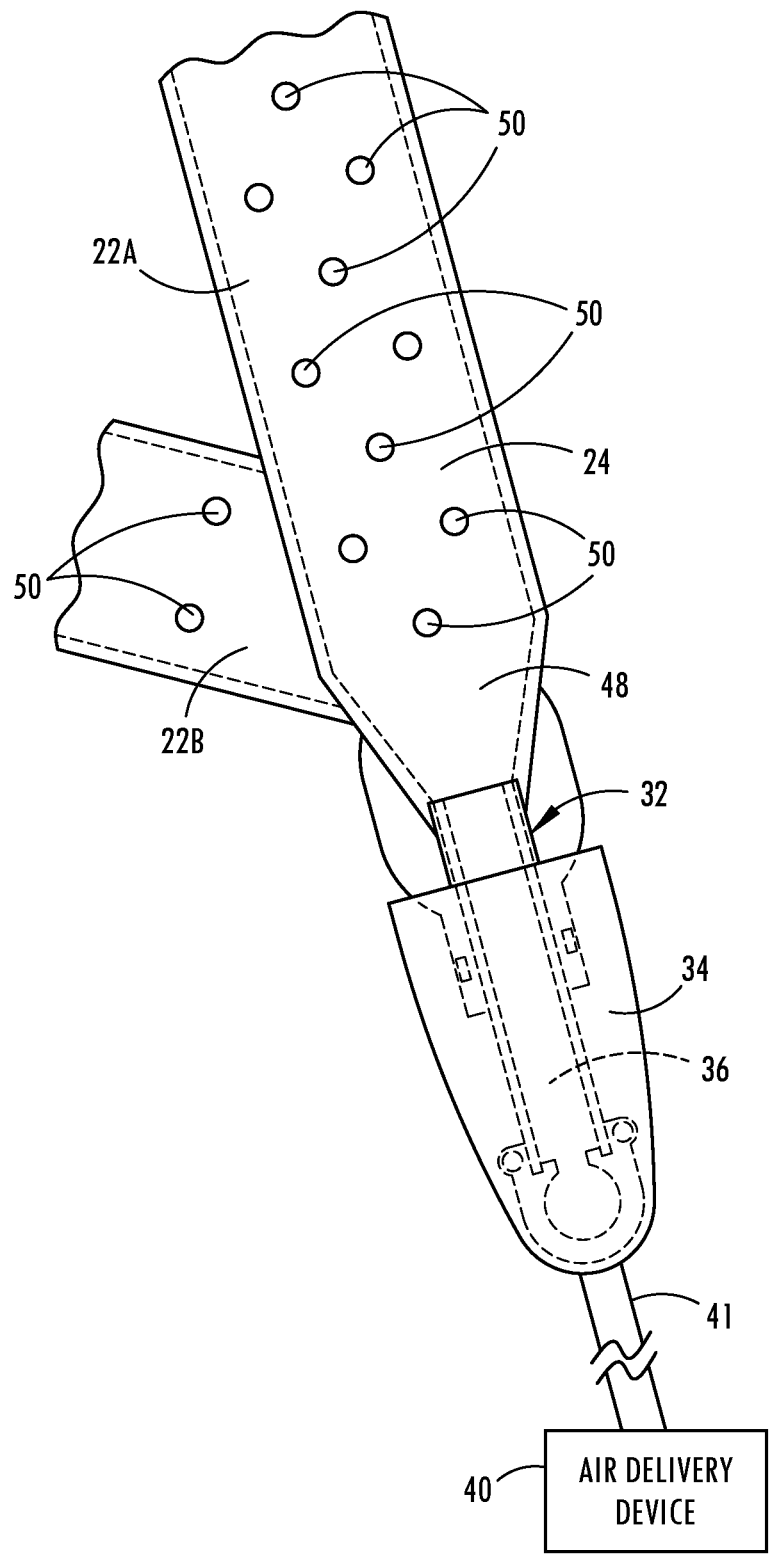
FIG. 2 is an enlarged side view of a portion of the seat assembly illustrating an air delivery device coupled to the seat belt buckle for delivery of air to the seat belt webbing.

As seen in FIG. 2, the air delivery device 40 delivers forced air to the air flow passageway 36 within the seat belt buckle 34 and the connecting tongue 32 fastened thereto. The connector tongue 32 and buckle 34 may have cooperating interior chambers that form the air flow passageway 36 similar to those employed in a seat belt airbag system, according to one embodiment. The air delivery device 40 may include a fan to force air into the air flow passageway 36 and into a passageway 48 in the seat belt webbing 24. The forced air builds up to a pressure within the passageway 48 due to the closed or partially closed chamber formed by the passageway 48. The air delivery device 40 delivers the forced air via an air delivery tube 41 into the air passageway 36. The air delivery tube 41 may be coupled or join together with the air passageway 36 which allows forced air to be delivered into the seat belt webbing 24. It should be appreciated that the vehicle seat belt system 20 may be employed with or without a seat belt airbag.

Figure 3:
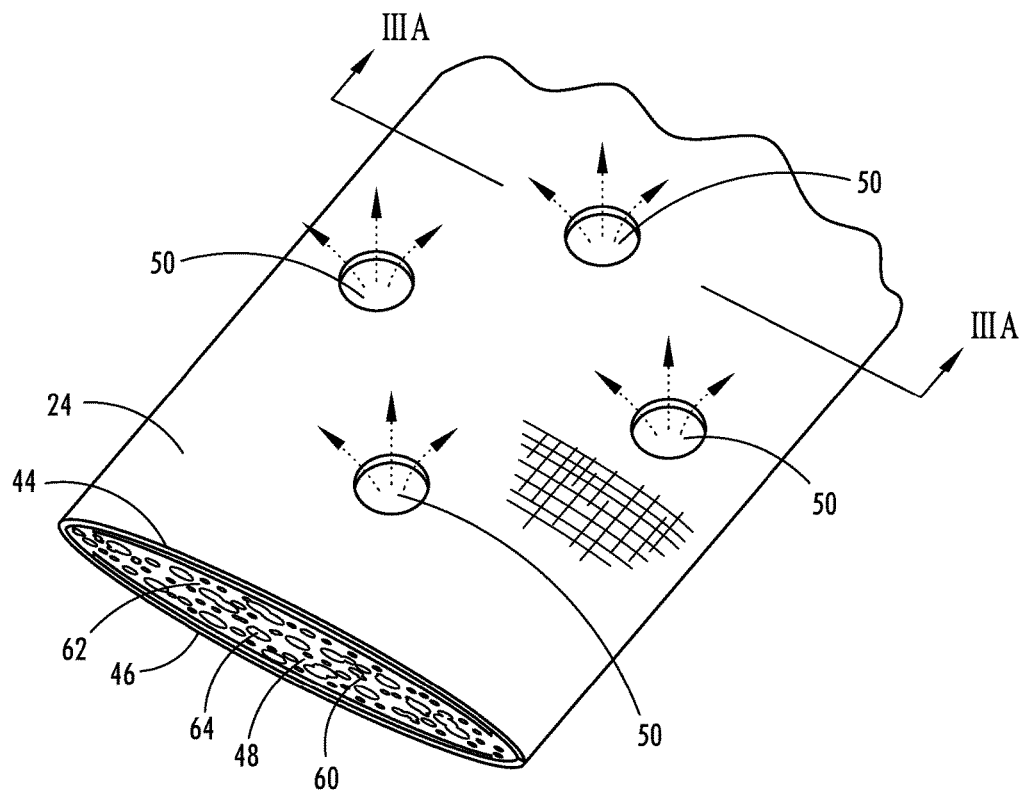
FIG. 3 is an enlarged portion of the seat belt webbing further illustrating an air porous compressible material forming an air diffusion manifold, according to one embodiment, for controlling air flow within and exiting the seat belt webbing.
Figure 3A:
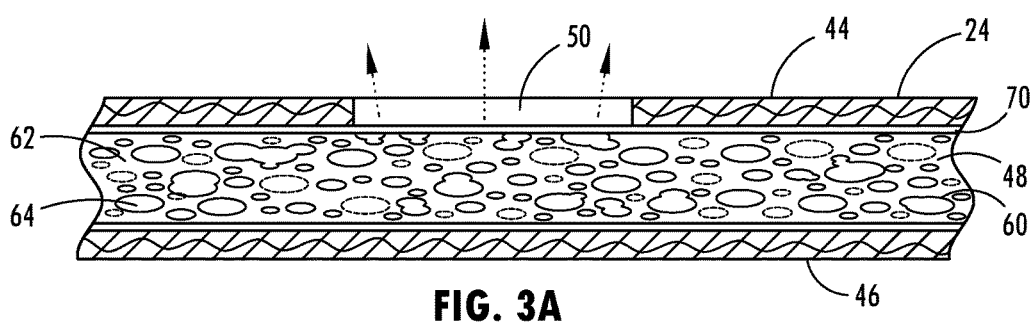
FIG. 3A is a cross-sectional view taken through line IIIA-IIIA of FIG. 3 further illustrating the air diffusion manifold in an uncompressed state.
Figure 3B:
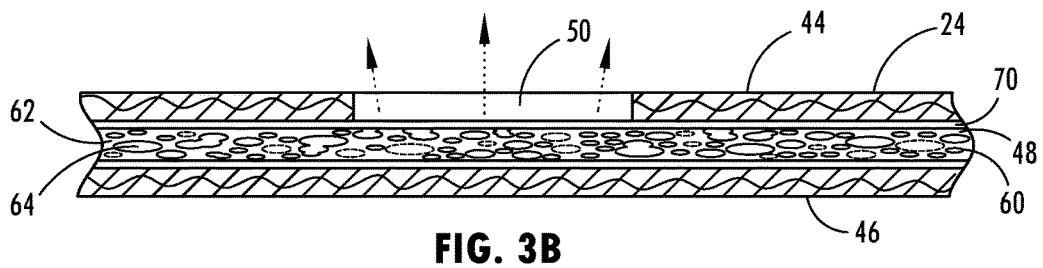
FIG. 3B is a cross-sectional view taken through line IIIA-IIIA of FIG. 3 showing the air diffusion manifold partially compressed.

The vehicle seat belt system 20 as shown in FIGS. 3-3B includes a seat belt webbing 24 defining the seat belt passageway 48 and a plurality of outlets or exhaust openings 50 located along the webbing 24 with the seat belt webbing 24 configured such that forced air flows out of the exhaust openings 50. The seat belt webbing 24 includes an air porous compressible material 60 that forms a separator air manifold disposed within the passageway 48 to allow the forced air to pass through the passageway 48 and out the exhaust openings 50 despite bending or pinching of the seat belt webbing 24. For example, when the seat belt webbing 24 passes over a sharp object or may otherwise be bent or pinched, the air porous compressible material 60 compresses to a limited extent to bend or otherwise deform and maintains a separation between layers with an air flow path to keep the air porous chamber of passageway 48 open to allow forced air to continue to flow through the passageway 48 and exit the exhaust openings 50.

The tubular seat belt webbing 24 is shown in a somewhat collapsed or flattened state having a top layer 44 connected to or integrally formed with a bottom layer 46 with the seat belt passageway 48 therebetween. The seat belt webbing 24 may be formed of a non-permeable material that prevents air from flowing through the material or substantially prevents air from flowing through the material, with the exception of air flowing through the exhaust openings 50. One example of a material suitable for forming the seat belt webbing 24 is a woven polyester which may be coated with a silicone layer to achieve a desired low level or no air permeability. In the embodiment shown, the exhaust openings 50 are formed in the top layer 44 of the webbing 24 such that the pressurized air output from the exhaust openings 50 is blown in close proximity to and around the occupant seated in the seat. The air thereby blows outward from the occupant and creates an air distribution zone around the occupant. Alternatively, or in addition, the air exhaust openings 50 could be located in the bottom layer 46 or sides of webbing 24 to blow air onto the occupant or in a region very close to the occupant. The air forced into and entering passageway 48 at the upstream side may be at a higher pressure at the inlet side than the air downstream at the opposite end of the seat belt webbing 24. In order to maintain air flow through the passageway 48 when the seat belt webbing 24 is compressed, the air porous compressible material is provided within the passageway 48.

Referring again to FIGS. 3-3B, one embodiment of an air porous compressible material 60 is illustrated disposed within the passageway 48. The air porous compressible material 60 substantially fills the passageway 48 to form a separator and an air diffusion manifold, according to the embodiment shown. The air porous compressible material 60 is composed of a flexible material that includes a solid material 62 and a plurality of pores or openings 64 that allow air to flow through the passageway when the air porous compressible material 60 is compressed due to a pinch or bending of the seat belt webbing 24. As seen in FIG. 3A, the pores or openings 64 allow forced air to flow through an opening or multiple openings in the passageway 48 from the inlet to the exhaust openings 50 when the seat belt webbing 24 is not compressed. When the webbing is compressed as shown in FIG. 3B, the air porous compressible material 60 resists complete collapse of the passageway 48 and maintains a separation distance between the top layer 44, bottom layer 46 and side walls therebetween sufficient to keep the pores or openings 64 open to allow air to flow through one or more openings through the passageway 48 and to reach and exit the exhaust openings 50. Thus, the seat belt webbing 24 may be bent or pinched or otherwise compressed to some degree, but the air porous compressible material 60 resists a complete closure of the air flow through the passageway 48 so as to allow for the forced air to pass through passageway 48 and exit the exhaust openings 50.

An air diffusion sheet or layer 70 may further be located between the air porous compressible material 60 and the inside surface of the webbing 24 to allow air to exit the exhaust opening 50. The air diffusion sheet or layer 70 may diffuse or evenly distribute the air to the exhaust opening 50.

The air porous compressible material 60 as seen in FIGS. 3-3B may include a rubber foam having open cell pores or openings 64 or other air porous and compressible material that provides an air diffusion manifold to allow air to pass through the passageway 48 and to defuse the air to evenly distribute the air to the exhaust openings 50. The rubber foam may be made of pores or openings 64 of a sufficient size to allow air flow. Thus, forced air is able to pass through a length of the seat belt webbing 24 and exit all of the exhaust openings 50. The air porous compressible material 60 shown as a porous material that is squishable or compressible to allow flexibility of the seat belt webbing 24 and prevent complete closure of the passageway 48. The pores or openings 64 provided by the air porous compressible material 60 may have the same size and shape or may have different sizes and shapes. Materials that absorb odor may be employed within the air porous compressible material 60. In other embodiments, the air porous compressible material 60 may be shaped as tubular structures with the same or varying lengths. Further, a coating may be provided on the pores or openings 64, such as a titanium dioxide, to suppress bacteria production and enhance air flow through the pores or openings 64.

The seat belt webbing 24 with the air diffusion manifold will provides enhanced comfort for the occupant without altering other functions of the seat belt. The porous structure of the air porous compressible material 60 may be designed to maintain a constant flow of air by altering the size of the pores 64 or openings in regions of the seat belt webbing 24. Enhanced effective movement of the forced air through the seat belt webbing 24 may result in enhanced effective heat removal or heating. The pores or openings 64 in the compressible material 60 can range from 100 square microns to 10 square centimeters in size or otherwise suitable to maintain desired air flow and pressure size and can have a coating to enhance air flow. Suitable materials for the air porous compressible material 60 include polyurethane, polycarbonate, polycarbonate alloys, ethyl vinyl acetate, polypropylene, polyethylene, polyvinylidene fluoride, polytetrafluoroethylene (PTFE), nylon webbing, polymer fibers (PE/PET), highly compressed polymer fibers, origami folded smart polymers, nanocapsules, aerogel, and naturally porous fibers like bamboo. Other suitable air porous compressible materials 60 may include smart materials, such as sheet memory polymers and shape memory alloys. Flexible metal alloys may also be used as the air porous compressible material 60.

Figure 4:
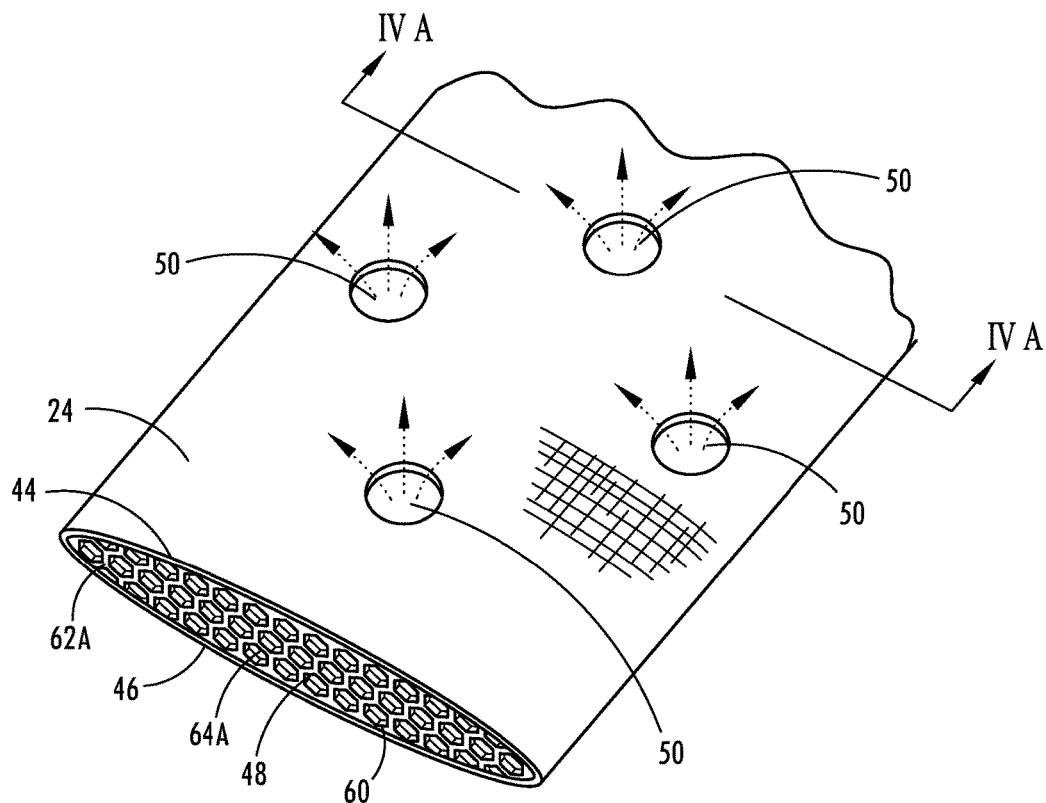
FIG. 4 is an enlarged portion of the seat belt webbing further illustrating an air diffusion manifold formed by an air porous compressible material having a lattice arrangement, according to another embodiment.
Figure 4A:
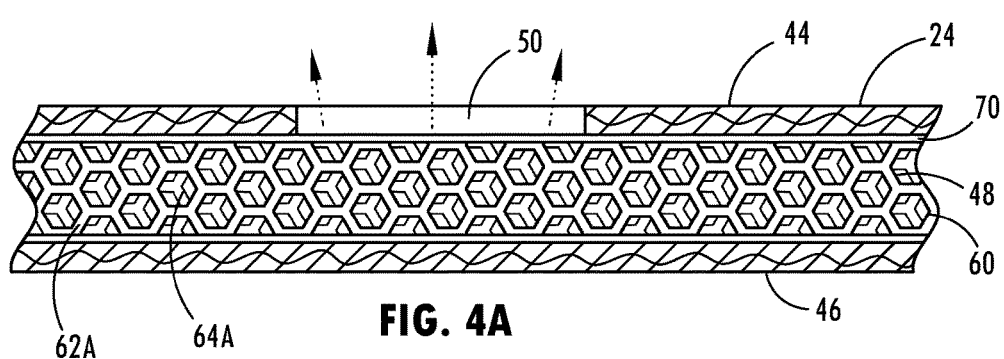
FIG. 4A is a cross-sectional view taken through line IVA-IVA of FIG. 4 further illustrating the air diffusion manifold in an uncompressed state.
Figure 4B:
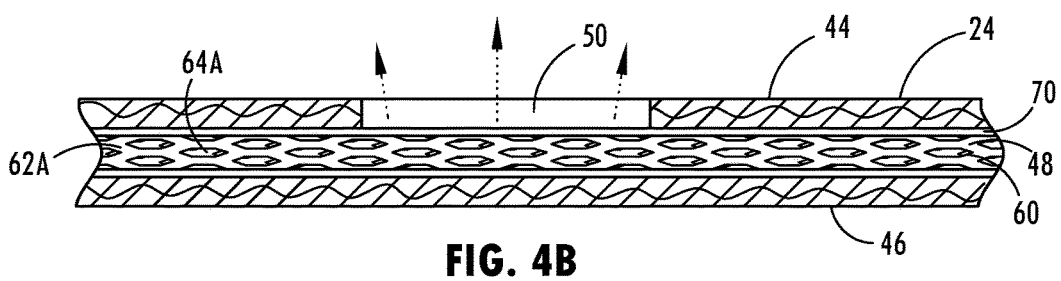
FIG. 4B is a cross-sectional view taken through line IVA-IVA of FIG. 3 showing the air diffusion manifold partially compressed.

Referring to FIGS. 4-4B, an air porous compressible material 60 is shown employed in the passageway 48 of the seat belt webbing 24, according to another embodiment. In this embodiment, the air porous compressible material 60 employs a compressible lattice structure. The compressible lattice structure has openings 64A in between the interconnected lattice of compressible material 62A that remain open despite compression of the compressible material 60. The lattice structure may be made of an elastomeric or dielectric elastomer, a printed polymer such as a nylon polymer in mesh or webbing form and other elastoplastic materials. The elastomer or plastic may be compressed and be able to withstand normal forces experienced with the seat belt during normal non-collision events. While at the same time allowing forced air to pass through the openings 64A within passageway 48 from the inlet to the exhaust openings 50.

Figure 5:
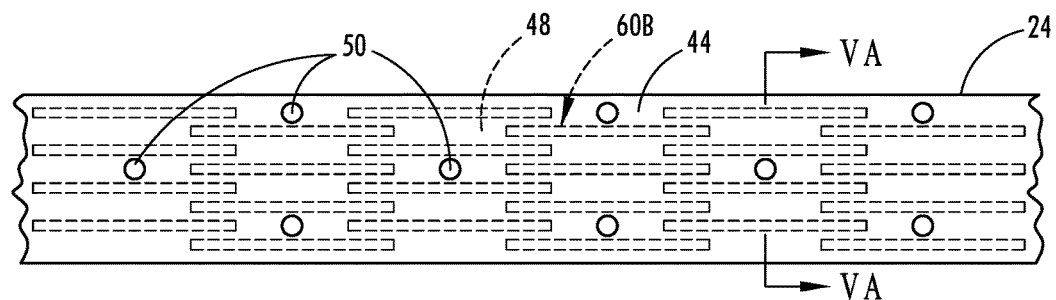
FIG. 5 is an enlarged top view of a portion of the seat belt webbing illustrating an air diffusion manifold formed by an air porous compressible material having springs, according to a further embodiment.
Figure 5A:
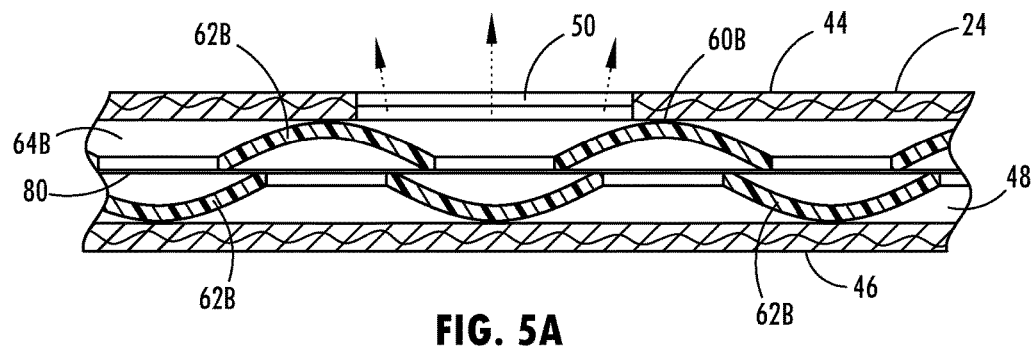
FIG. 5A is a cross-sectional view taken through line VA-VA of FIG. 5 further illustrating the air manifold in an uncompressed state.
Figure 5B:
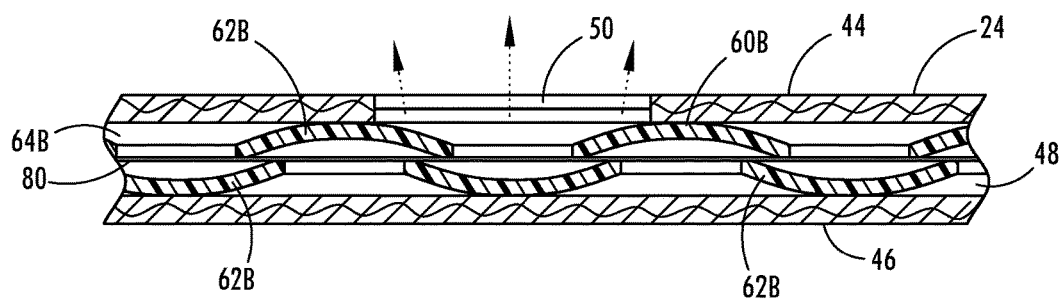
FIG. 5B is a cross-sectional view taken through line VIA-VIA of FIG. 5 illustrating the air manifold partially compressed.

Referring to FIGS. 5-5B, an air porous compressible material 60 is shown having an air porous compressible material 60 made of a spring-like structure that forms an air diffusion manifold within the passageway 48 according to a further embodiment. The compressible material 60 employs a plurality of springs 62B on opposite sides of a support sheet 80. The springs 62B are shown as concave shaped springs which may be compressed and they allow air to flow within openings 64B around the springs 62B. As the seat belt 24 is pinched, bent or otherwise compressed, the springs 62B resist complete closure of the passageway 48 and allow air to flow through the openings 64B between the spring elements 62B. The springs 62B may be made of metal, plastic or other spring material. It should be appreciated that other spring shapes, such as coil springs may be employed to provide a compressible material 60 that allows air to flow through the passageway 48 in seat belt webbing 24 to the exhaust openings 50.

In the embodiment shown, the exhaust openings 50 have a substantially circular shape with a constant diameter. However, it should be appreciated that the exhaust openings may have other shapes and sizes and may be configured in other orientations and arrangements. Additionally, the exhaust openings are shown on the top layer 44 of the seat belt webbing 24, however, the exhaust openings 50 may be formed on the top layer 44, the bottom layer 46 and/or on the side layers between the top and bottom layers 44 and 46.

Accordingly, the vehicle seat belt system 20 advantageously provides for a plurality of exhaust openings 50 and an air porous compressible material 60 that flexes and compresses to allow the webbing 24 to bend and allows for uninterrupted forced air flow from the inlet side to the exhaust openings 50 despite bending or pinching of the seat belt webbing 24. As a result, the vehicle seat belt system 20 advantageously provides for enhanced air flow through the seat belt webbing 24 despite different use situations.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat belt system comprising:
 a seat belt comprising a tubular seat belt webbing defining a passageway and a plurality of exhaust openings;
 an air porous compressible material disposed within the passageway and configured to keep the passageway open to allow forced air to flow through the passageway; and
 an air delivery device supplying air to the seat belt to deliver the forced air into the passageway, through the air porous compressible material and exiting the plurality of exhaust openings to create an air distribution zone around an occupant, wherein the air porous compressible material allows air to flow through the passageway when compressed.

2. The seat belt system of claim 1, wherein the air porous compressible material comprises openings having a size in the range of 100 square microns to 10 square centimeters.

3. The seat belt system of claim 1, wherein the air porous compressible material comprises a lattice structure.

4. The seat belt system of claim 1, wherein the air porous compressible material comprises a rubber foam material.

5. The seat belt system of claim 1, wherein the seat belt comprises a shoulder belt, wherein the passageway, the plurality of exhaust openings and the air porous compressible material are formed in the shoulder belt.

6. The seat belt system of claim 1 further comprising a buckle for connecting with the seat belt webbing, wherein air from the air delivery device enters the webbing through the buckle.

7. The seat belt system of claim 1, wherein the air porous compressible material comprises at least one of polyurethane, polycarbonate, polycarbonate alloys, ethyl vinyl acetate, polypropylene, polyethylene, polyvinylidene fluoride, polytetrafluoroethylene (PTFE), nylon webbing, polymer fibers (PE/PET), highly compressed polymer fibers, origami folded smart polymers, nanocapsules, aerogel, and naturally porous fibers.

8. A vehicle seat belt system comprising:
 a seat belt comprising a tubular seat belt webbing defining a passageway and a plurality of exhaust openings;
 an air porous compressible material disposed within the passageway and configured to keep the passageway open to allow forced air to flow through the passageway; and
 an air delivery device supplying air to the seat belt to deliver the forced air into the passageway, through the air porous compressible material and exiting the plurality of exhaust openings to create an air distribution zone around an occupant, wherein the air porous compressible material maintains an opening in the passageway to allow air to flow through the passageway when compressed.

9. The seat belt system of claim 8, wherein the air porous compressible material comprises openings having a size in the range of 100 square microns to 10 square centimeters.

10. The seat belt system of claim 8, wherein the air porous compressible material comprises a lattice structure.

11. The seat belt system of claim 8, wherein the air porous compressible material comprises a rubber foam material.

12. The seat belt system of claim 8, wherein the seat belt comprises a shoulder belt, wherein the passageway, the exhaust openings and the air porous compressible material are formed in the shoulder belt.

13. The seat belt system of claim 8 further comprising a buckle for connecting with the seat belt webbing, wherein air from the air delivery device enters the webbing through the buckle.

14. The seat belt system of claim 8, wherein the air porous compressible material comprises at least one of polyurethane, polycarbonate, polycarbonate alloys, ethyl vinyl acetate, polypropylene, polyethylene, polyvinylidene fluoride, polytetrafluoroethylene (PTFE), nylon webbing, polymer fibers (PE/PET), highly compressed polymer fibers, origami folded smart polymers, nanocapsules, aerogel, and naturally porous fibers.

* * * * *